(12) United States Patent
Maeda

(10) Patent No.: US 7,815,262 B2
(45) Date of Patent: Oct. 19, 2010

(54) TRACK BELT ASSEMBLY

(75) Inventor: Kazuo Maeda, Osaka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 12/281,981

(22) PCT Filed: Apr. 23, 2007

(86) PCT No.: PCT/JP2007/058696

§ 371 (c)(1),
(2), (4) Date: Sep. 6, 2008

(87) PCT Pub. No.: WO2007/125843

PCT Pub. Date: Nov. 8, 2007

(65) Prior Publication Data

US 2009/0045674 A1    Feb. 19, 2009

(30) Foreign Application Priority Data

Apr. 25, 2006    (JP) .............................. 2006-121126

(51) Int. Cl.
*B62D 55/205* (2006.01)
(52) U.S. Cl. ....................... 305/198; 305/160
(58) Field of Classification Search ......... 305/159–162, 305/51, 187–188, 191, 198, 200–201, 196
See application file for complete search history.

(56) References Cited

U.S. PATENT DOCUMENTS

| | | | | |
|---|---|---|---|---|
| 1,314,649 A | * | 9/1919 | Holt | 305/117 |
| 2,558,922 A | * | 7/1951 | Bechman et al. | 305/162 |
| 3,419,316 A | * | 12/1968 | Mazzarins | 305/188 |
| 3,815,962 A | * | 6/1974 | Stedman et al. | 305/187 |
| 5,741,052 A | * | 4/1998 | Fikse | 305/170 |
| 6,382,742 B1 | | 5/2002 | Hasselbusch et al. | |
| 6,386,651 B1 | | 5/2002 | Gerardin et al. | |
| 2003/0122423 A1 | * | 7/2003 | Banerjee et al. | 305/159 |
| 2003/0122425 A1 | * | 7/2003 | Banerjee | 305/201 |
| 2003/0141760 A1 | | 7/2003 | Yamamoto | |
| 2005/0088042 A1 | | 4/2005 | Hisamatsu | |
| 2009/0026836 A1 | * | 1/2009 | Maeda | 305/198 |
| 2009/0066154 A1 | * | 3/2009 | Maeda | 305/201 |

FOREIGN PATENT DOCUMENTS

JP        47-30336        12/1972

(Continued)

OTHER PUBLICATIONS

Extended European Search Report, dated Apr. 27, 2009 for related Application No./ Patent No. 07742131.1-2425 / 2011724 PCT/JP2007058696.

*Primary Examiner*—Jason R Bellinger
(74) *Attorney, Agent, or Firm*—Fox Rothschild LLP

(57) ABSTRACT

A track chain assembly (22) has a track shoe (25) and a pair of parallel links (26) that are fixed to a non ground-engaging surface of the track shoe (25) with bolts (36). A connecting shaft (27) is fixed to shaft holes (31) that are provided on end portions each of which is included in the links (26). A reinforcing member (48) connects the links (26) with the bolts (36) so as to reinforce an open side between the links (26). Therefore, the links (26) are prevented from being damaged due to concentration of stress on a specific portion of each link (26).

3 Claims, 15 Drawing Sheets

FOREIGN PATENT DOCUMENTS

| | | |
|---|---|---|
| JP | 55-52488 | 4/1980 |
| JP | 64-9885 | 1/1989 |
| JP | 6-504747 | 6/1994 |
| JP | 09-066870 | 3/1997 |
| JP | 2000-219168 | 8/2000 |
| JP | 2003-220983 | 8/2003 |
| JP | 2004-249973 | 9/2004 |
| JP | 2005-001626 | 1/2005 |
| WO | 9311020 | 6/1993 |

\* cited by examiner

TRACK BELT ASSEMBLY

FIELD OF THE INVENTION

The present invention relates to a track chain assembly that forms a track chain for a track-type work machine.

BACKGROUND OF THE INVENTION

Generally, a track chain of a track-type work machine such as a hydraulic excavator or a bulldozer is formed by connecting a plurality of track chain assemblies in an endless state. The track chain is wound around a drive wheel and an idler wheel that are arranged in a body frame of the track-type work machine with a predetermined distance therebetween. When each track chain assembly is engaged to a sprocket of the drive wheel and driven, the track chain is moved while being supported by carrier rollers and track rollers that are arranged in the body frame between the drive wheel and the idler wheel.

A track chain assembly disclosed in FIG. 7 of Patent Document 1 has been conventionally known. In the track chain assembly disclosed in the document, a track shoe is fixed to a connecting link pair in which a pair of track shoe connecting links is arranged in parallel to each other. A support shaft is fixed between end portions each of which is included in one of the track shoe connecting links, and a sleeve is fixed between the other end portions each of which is included in one of the track shoe connecting links. The support shaft of the track chain assembly is rotatably inserted through the sleeve of an adjacent track chain assembly. Accordingly, a plurality of track chain assemblies are connected to each other to form an endless track chain.

In the above-described track chain, the sleeve functions as a bearing member that rotatably connects adjacent track chain assemblies each other and also functions as a power transmission member that receives power transmitted from a sprocket by being engaged with the drive wheel. However, since the sleeve is fixed to the connecting link pair in the related art track chain assembly, the sleeve receives high surface pressure in a specific portion and slidingly contacts tooth surfaces of the sprocket when the work machine moves backward. Therefore, the sleeve of each track chain assembly may be unevenly worn in a relatively early stage. When this happens, a portion of the sleeve that corresponds to and is fixed to the support shaft is forcibly moved with respect to the support shaft so as to be turned over (this operation is referred to as a bushing turn). However, the turning-over operation is troublesome and increases running cost.

To solve such a problem, for example, a track chain assembly disclosed in Patent Document 2 has been proposed. In the track chain assembly, the sleeve provided between the track shoe connecting links is divided into three portions in an axial direction of the sleeve. Each end portion of the sleeve is fixed to a shaft hole formed on an end portion of one of the track shoe connecting links, and a middle portion of the sleeve is externally fitted to the support shaft of an adjacent track chain assembly so as to be rotatable. Accordingly, relative sliding of the sprocket and the sleeve is allowed when the sleeve is engaged to the sprocket teeth. This prevents wear of the sleeve at an early stage.

On the other hand, Patent Documents 3 and 4 disclose track chains provided with track chain assemblies having following configurations. Specifically, in Patent Document 3, an elastic plate made of reinforced rubber or other materials is attached to each track chain assembly with an iron plate at a front wall surface of the track chain assembly that is a part of a ground-engaging surface of the track shoe. A distal end portion of the elastic plate of each track chain assembly contacts an adjacent track chain assembly at a rear wall surface of the adjacent track chain assembly that is also a part of the ground-engaging surface of the track shoe. Accordingly, a space between the track shoes of the two adjacent track chain assemblies is closed and muddy water is prevented from entering the space.

In Patent Document 4, a laminate plate comprising a plurality of laminated thin plates is fixed to a non ground-engaging surface of the track shoe in each track chain assembly. The laminate plate is discretely welded to the non ground-engaging surface of the track shoe. In the laminate plate, the adjacent thin plates are discretely connected to fix to each other. In this case, when the track shoe vibrates, quite small positional deviation or space may be caused between the track shoe and the laminate plate and between the thin plates of the laminate plate. According to the occurrence of the quite small positional deviation or space, the vibrational energy is converted to thermal energy due to friction or collision between the track shoe and the laminate plate and between the thin plates of the laminate plate. Accordingly, vibration and noise due to the vibration are reduced.

In the configuration disclosed in FIG. 7 of Patent Document 1, the track chain assembly has the pair of links, the connecting shaft fixed between end portions at one end of the links, and the sleeve fixed between the other end portions each of which is included in one of the links, and has a rectangular shape having four sides. In the configuration disclosed in Patent Document 2, the track chain assembly has the pair of links and the connecting shaft fixed between end portions at one end of the links, and has a rectangular shape with one side positioned between the links being open. In the configuration disclosed in Patent Document 2, rigidity of the links is lower than the configuration disclosed in Patent Document 1. In other words, in the configuration disclosed in Patent Document 2, if a force acts on the open side between the links so as to enlarge the open side, stress is concentrated on portions of the links near the connecting shaft and the portions may be damaged.

Therefore, in the track chain assembly disclosed in Patent Document 2 having a configuration of the rotatable sleeve, the links are required to be formed to be strong. However, the track chain having the track chain assembly with a configuration of a non-rotatable sleeve is more widely distributed and used than the track chain having the track chain assembly with a configuration of the rotatable sleeve. Since the parts of the track chain assembly are expendable supplies, the parts are required to be common in the track chain assemblies having the sleeves with different configurations and required to have interchangeability. In this point, in the track chain assembly having a rotatable sleeve, it is preferable to avoid using a link having high rigidity and a specific structure.

Further, in Patent Document 3, the elastic plate attached to the ground-engaging surface of the track shoe closes the space between the track shoes of the adjacent two track chain assemblies, however, does not increase the rigidity of the links of each track chain assembly. The iron plate that is provided for attaching the elastic plate to the ground-engaging surface of the track shoe is provided to the track shoe in a cantilever like fashion to hold the elastic plate and does not contribute to increase of the rigidity of the track chain assembly. The iron plate is provided in a recess of the track shoe to avoid contact with the road surface, and the recess lowers the rigidity of the track chain assembly.

In Patent Document 4, the laminate plate that is fixed to the non ground-engaging surface of the track shoe reduces vibration of the track shoe and noise due to the vibration. However, since the laminate plate is supported by the track shoe so as to generate positional deviation between the track shoe and the laminate plate, the rigidity of the track chain assembly is not increased by the laminate plate.

Patent Document 1: Japanese Laid-Open Patent Publication No. 2004-249973

Patent Document 2: Japanese National Phase Laid-Open Patent Publication No. 6-504747

Patent Document 3: Japanese Laid-Open Patent Publication No. 9-66870

Patent Document 4: Japanese Laid-Open Patent Publication No. 2000-219168

SUMMARY OF THE INVENTION

An objective of the present invention is to provide a track chain assembly that reinforces an open side between links with a simple configuration and without making a great change in a general configuration and that prevents damage of the links due to concentration of stress on a specific portion of each of the links.

To achieve the above objective, the present invention provides a track chain assembly comprising: a track shoe having a ground-engaging surface and a non ground-engaging surface that is opposite to the ground-engaging surface; a plurality of bolts; a pair of parallel links that are fixed to the non ground-engaging surface of the track shoe by the bolts, each link having a first end portion and a second end portion, wherein a shaft hole is provided in the first end portion and the second end portion of each link, and the first end portion and the second end portion of each link are connectable to other adjacent link; a connecting shaft fixed to the shaft holes provided in the first end portions of the links; an open side between the links, the open side being created by spacing the second ends of the links so as to be free from each other; and a reinforcing member that connects the links with the bolts, thereby reinforcing the open side.

According to the above configuration, the open side between the links can be reinforced with a simple structure without largely changing the configuration of components such as the links. Accordingly, even if a force acts on the open side between the links of the track chain assembly so as to enlarge the open side, the links are prevented from being damaged due to concentration of stress on a specific portion of each of the links near the connecting shaft.

In the track chain assembly, the reinforcing member may be provided on the ground-engaging surface of the track shoe. In this case, the reinforcing member is integrally fixed to the track shoe and the links simultaneously by the bolts, when the links are fixed to the non ground-engaging surface of the track shoe. Accordingly, the reinforcing member is easily attached to the track shoe.

In the track chain assembly, it is preferable that portions of the reinforcing member corresponding to head portions of the bolts are thinner than remaining portions of the reinforcing member. In this case, a great thickness of the remaining portions of the reinforcing member is ensured. This improves the effect of the reinforcing member for reinforcing the open side between the links. The head portions of the bolts is protected by the thick portions of the reinforcing member.

In the track chain assembly, the reinforcing member may be provided between the links so as to face the non ground-engaging surface of the track shoe. In this case, the links are directly connected to each other by the reinforcing member.

In the track chain assembly, it is preferable that a window hole is provided in each link. It is preferable that a distal end portion of each bolt is positioned in the corresponding window hole, and each end portion of the reinforcing member is fixed to the distal end portion of the bolt positioned in the corresponding window hole. In this case, the reinforcing member is easily arranged between the links so as to face the non ground-engaging surface of the track shoe without interfering with the links.

In the track chain assembly, it is preferable that an internal thread is provided on each end portion of the reinforcing member such that the distal end portion of the corresponding bolt is threaded to the internal thread. In this case, nuts for fixing the bolts are omitted and this reduces the number of parts.

DETAILED DESCRIPTION OF THE PREFERRED EMBODIMENTS

First Embodiment

A first embodiment of the present invention will now be described with reference to FIGS. 1 to 6.

Figure 1:
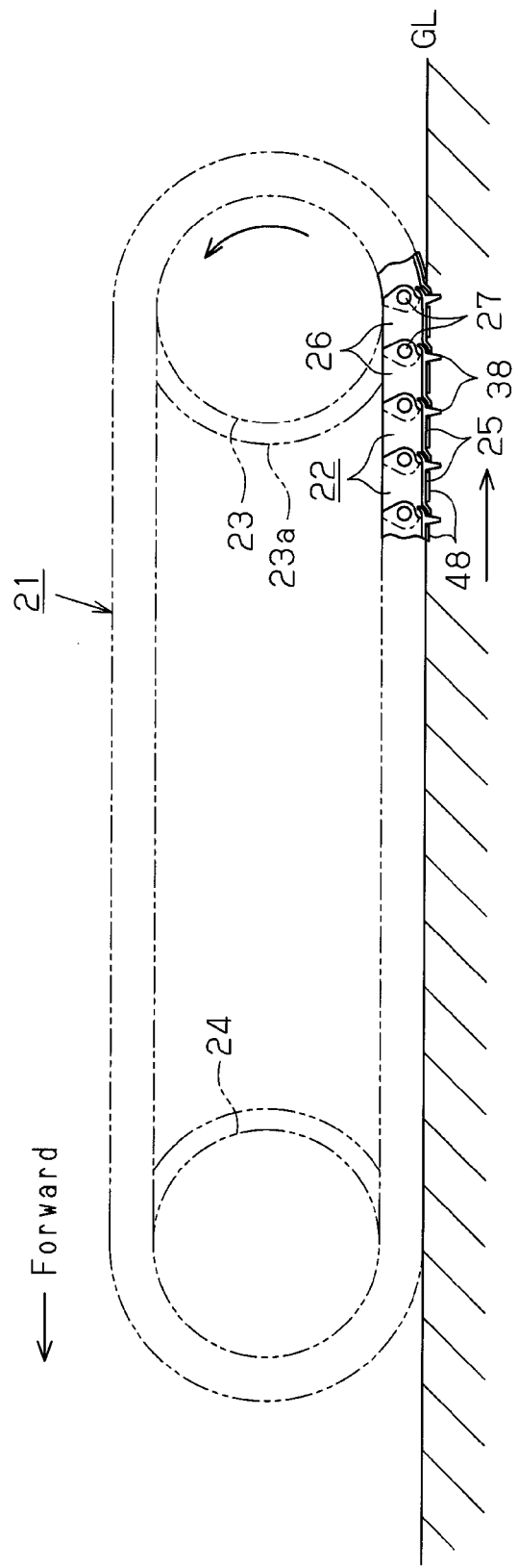
FIG. 1 is a front view showing a track chain having track chain assemblies according to a first embodiment of the present invention.

As shown in FIG. 1, a track chain 21 according to the first embodiment is formed by connecting a plurality of track chain assemblies 22 in an endless state. The track chain 21 is wound around a drive wheel 23 and an idler wheel 24 that are arranged in a body frame of a track-type work machine such as a bulldozer or a hydraulic excavator with a predetermined distance therebetween. In this state, each of the track chain assemblies 22 is meshed with sprocket teeth 23a of the drive wheel 23 and moves around the drive wheel 23 and the idler wheel 24. A plurality of carrier rollers and track rollers (not shown) are supported by the body frame between the drive wheel 23 and the idler wheel 24. The track chain 21 moves around the drive wheel 23 and the idler wheel 24 while being supported by the carrier rollers and the track rollers such that the work machine runs on a ground GL. An arrow shown at a lower portion in FIG. 1 shows a moving direction of the track chain 21 that contacts the ground and the work machine moves forward in a direction shown by an arrow shown at an upper portion in FIG. 1 according to the movement of the track chain 21.

As shown in FIGS. 2 to 5, each of the track chain assemblies 22 has a track shoe 25 and a pair of parallel links 26 that are fixed to a non ground-engaging surface of the track shoe 25. A connecting shaft 27 is fixed between end portions (first end portions) each of which is included in one of the links 26, and a sleeve 28 is provided between the other end portions (second end portions) each of which is included in one of the links 26. The sleeve 28 is externally fitted to the connecting shaft 27 of an adjacent track chain assembly 22 so as to be rotatable. Each sleeve 28 is externally fitted to the corresponding connecting shaft 27 such that the adjacent two track chain assemblies 22 are connected to each other via the connecting shaft 27 and the endless track chain 21 is formed.

As shown in FIGS. 2 to 6, a pair of shaft holes 31, 32 are formed on two end portions of each link 26. The first shaft hole 31 has a relatively small diameter such that an end portion of the connecting shaft 27 is pressed into and fixed to the first shaft hole 31. The second shaft hole 32 has a relatively large diameter such that an end portion of the sleeve 28 is inserted through and supported by the second shaft hole 32. A pair of insertion holes 33 are formed in a center portion of each link 26 so as to extend in a direction perpendicular to axes of the shaft holes 31, 32 with a predetermined distance therebetween. A pair of window holes 34 are formed in the center portion of each link 26 so as to communicate with the respective insertion holes 33.

An insertion hole 35 is formed in each track shoe 25 corresponding to each of the insertion holes 33 of each link 26. A bolt 36 is inserted through each insertion hole 35 of the track shoe 25 and one of the insertion holes 33 of the corresponding link 26 from the ground-engaging surface of the track shoe 25. A nut 37 is screwed to the distal end portion of each bolt 36 in the corresponding window hole 34. The bolt 36 and the nut 37 fix one of the links 26 on the non ground-engaging surface of the corresponding track shoe 25.

Figure 2:
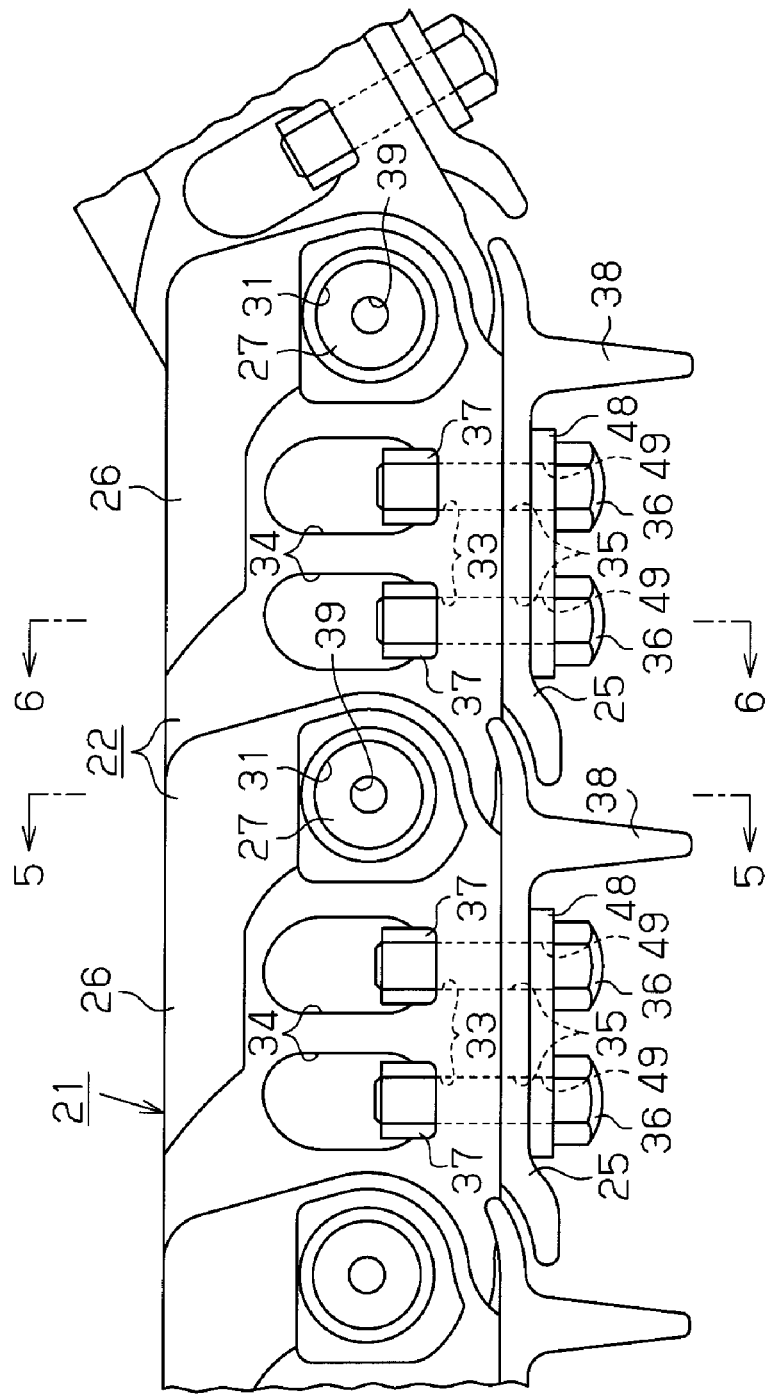
FIG. 2 is an enlarged front view partially showing the track chain of FIG. 1.
Figure 3:
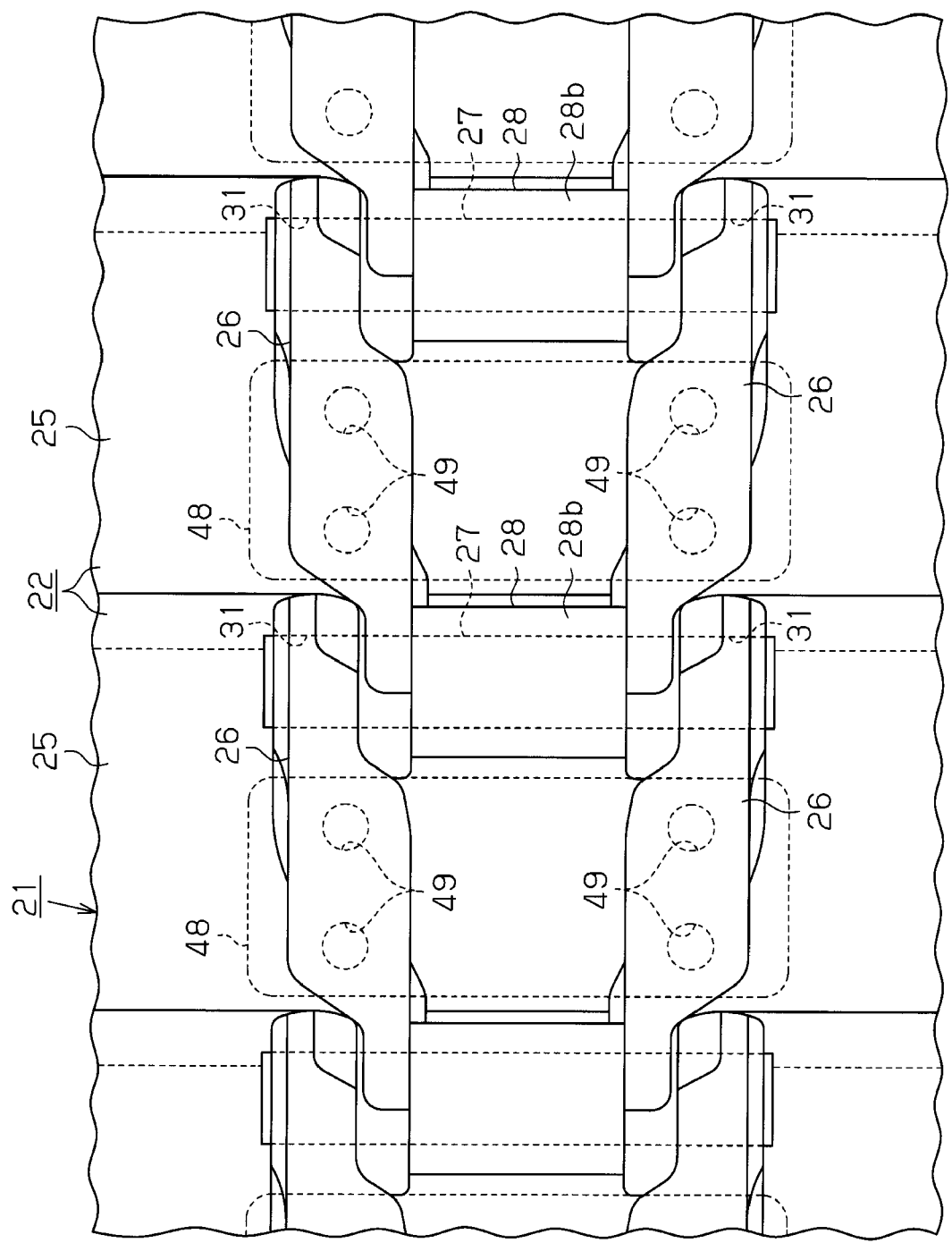
FIG. 3 is a plan view partially showing the track chain of FIG. 1.
Figure 4:
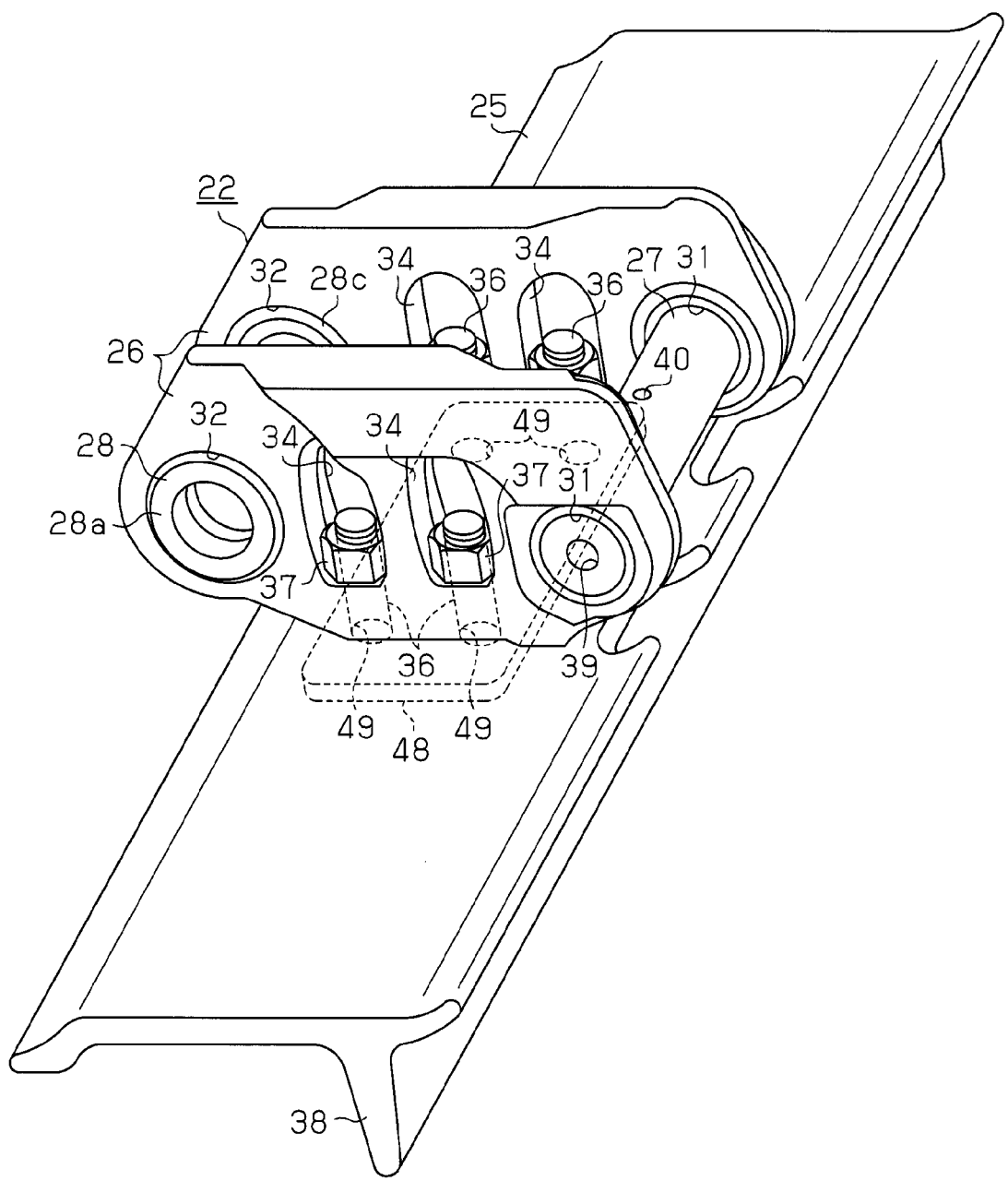
FIG. 4 is a perspective view showing a track chain assembly of the track chain of FIG. 1.

As shown in FIGS. 2 and 4, each of the track shoes 25 has a grouser 38 that protrudes from the ground-engaging surface of the track shoe 25 and extends in a width direction of the track shoe 25. The grouser 38 is provided along a rear end portion (a right end portion in FIG. 4) of the track shoe 25. The track shoe 25 and the links 26 are fixed to each other by the bolts 36 and the nuts 37 such that the grouser 38 is arranged adjacent to the first shaft hole 31 of each link 26 of the track chain assembly 22. In other words, the grouser 38 is arranged adjacent to a closed portion of the track chain assembly 22 (connecting portions of the connecting shaft to the links) having a three-side structure that is formed by the two links 26 and the connecting shaft 27.

Figure 5:
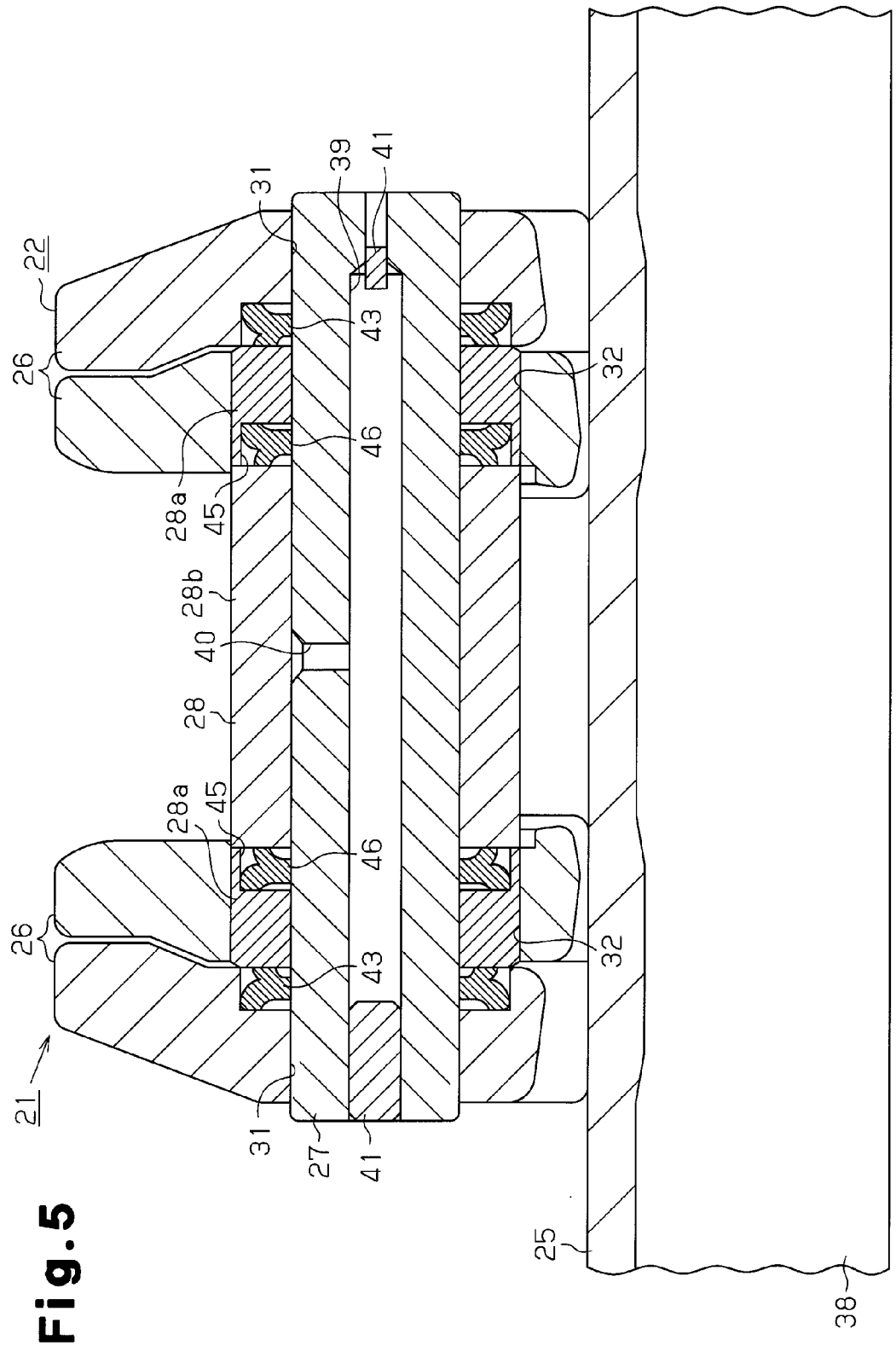
FIG. 5 is a partial enlarged cross-sectional view taken along line 5-5 of FIG. 2.
Figure 6:
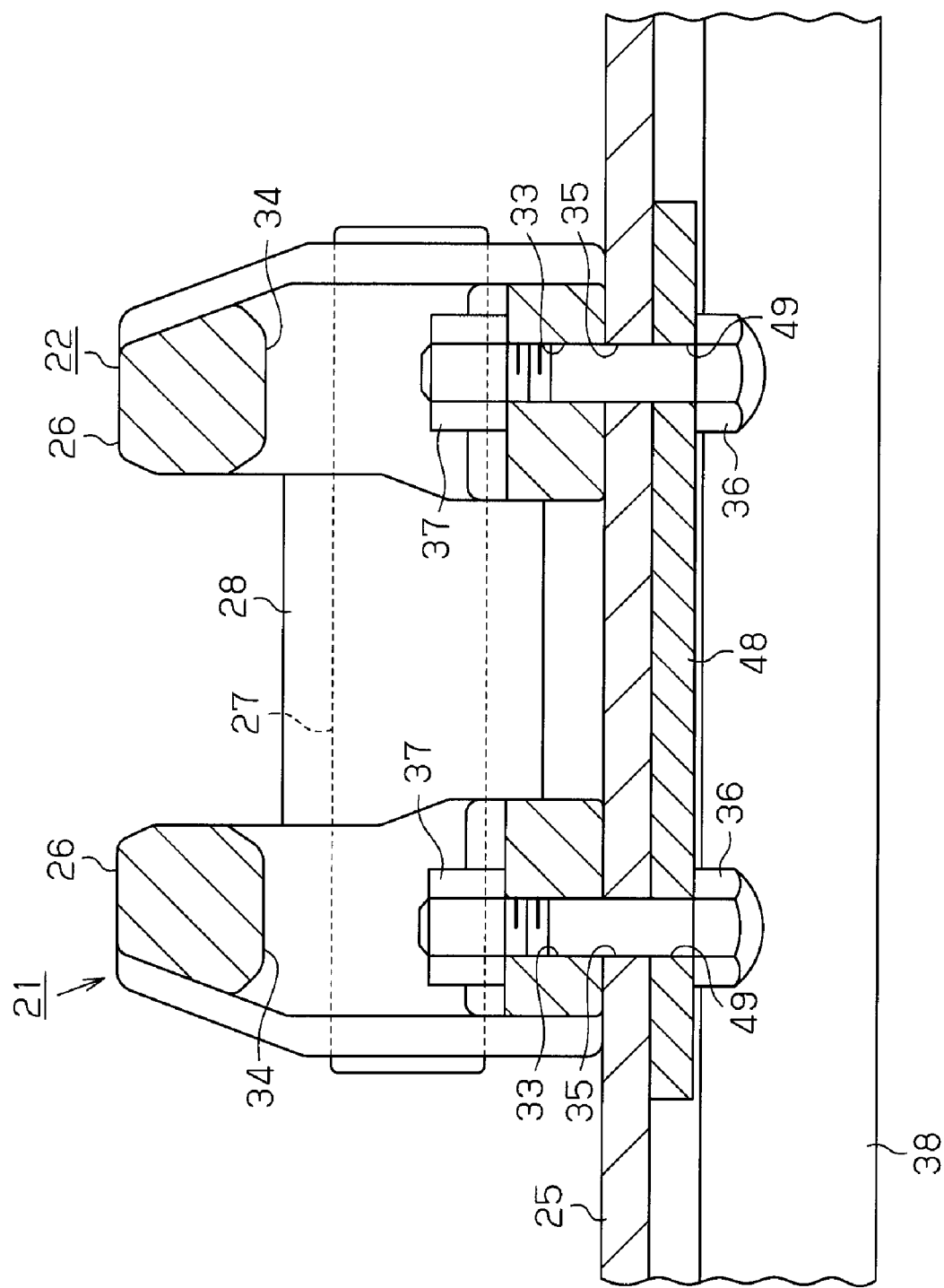
FIG. 6 is a partial enlarged cross-sectional view taken along line 6-6 of FIG. 2.

As shown in FIG. 5, the sleeve 28 is divided into three portions 28a, 28b along its axial direction. Each of the two end portions 28a is pressed into and fixed by the second shaft hole 32 of the corresponding link 26. The middle portion 28b of the sleeve 28 is externally fitted to the connecting shaft 27 of the adjacent track chain assembly 22 so as to be rotatable. This allows co-sliding of the sprocket teeth 23a and the outer circumferential surface of the middle portion 28b and uneven wear of the sleeve 28 at the early stage is prevented.

A lubricant storing hole 39 is formed at a center of each connecting shaft 27 as shown in FIG. 5. A lubricant supplying hole 40 is formed in each connecting shaft 27 so as to extend from the middle portion of the lubricant storing hole 39 to an outer peripheral surface of the connecting shaft 27. Closing plugs 41 are fitted to the two end portions of each lubricant storing hole 39. Lubricant injected into the lubricant storing hole 39 is supplied to a space between the outer peripheral surface of the connecting shaft 27 and the inner peripheral surface of the sleeve 28 through the lubricant supplying hole 40. Accordingly, a sliding property of the sliding portion between the connecting shaft 27 and the sleeve is ensured.

As shown in FIG. 5, a first seal ring 43 is provided between an outer surface of each end portion 28a of the sleeve 28 and an inner surface of the adjacent track shoe connecting link 26. An accommodation recess 45 is formed in an inner surface of each end portion 28a of the sleeve 28. A second seal ring 46 is provided in each accommodation recess 45 so as to be joined to the end surfaces of the middle portion 28b of the sleeve 28. The first seal rings 43 and the second seal rings 46 suppress leaking of the lubricant from the two end portions of the connecting shaft 27.

As shown in FIGS. 2 to 4 and 6, a reinforcing member 48 formed of a plate is fixed on the ground-engaging surface of each track shoe 25 by the bolts 36 so as to connect the links 26 to each other. Specifically, insertion holes 49 are formed in the reinforcing member 48 corresponding to the insertion holes 35 of the track shoe 25. Each bolt 36 is inserted through the corresponding insertion hole 49 of the reinforcing member 48, the corresponding insertion hole 35 of the track shoe 25, and the corresponding insertion hole 33 of the links 26 in a state that the reinforcing member 48 contacts the ground-engaging surface of the track shoe 25. A nut 37 is screwed to the distal end portion of each of the bolts 36. Accordingly, the reinforcing member 48, the track shoe 25, and the links 26 are integrally fixed to each other.

As is described above, the track chain assembly 22 of the first embodiment has a rectangular structure where the end portions (second end portions) closer to the second shaft holes 32 of the links 26 are spaced so as to be free from each other, that is a three-side structure. However, the open side between the links 26 can be reinforced with a simple structure that the reinforcing member 48 is fixed to the ground-engaging surface of the track shoe 25 and without changing the configuration of the components such as the links 26.

Therefore, according to the first embodiment, the following advantages are obtained.

The open side between the links 26 is reinforced with a simple and general configuration without making a special work on the links 26, for example making the link 26 thicker or bulkier.

Since the links 26 are connected to each other by the reinforcing member 48, the links are prevented from being damaged due to the stress concentration on the portions of the links 26 adjacent to the connecting shaft 27 even if the force acts on the open side between the links 26 so as to enlarge the open side.

For attaching the reinforcing member 48 to the track shoe 25, the reinforcing member 48 is integrally fixed to the track shoe 25 and the links 26 by the bolts 36 and the nuts 37 when the links 26 are fixed to the non ground-engaging surface of the track shoe 25. Therefore, the track chain assembly 22 provided with the reinforcing member 48 is assembled easily.

Second Embodiment

Next, a second embodiment of the present invention will now be described. The differences from the first embodiment will mainly be discussed.

Figure 7:
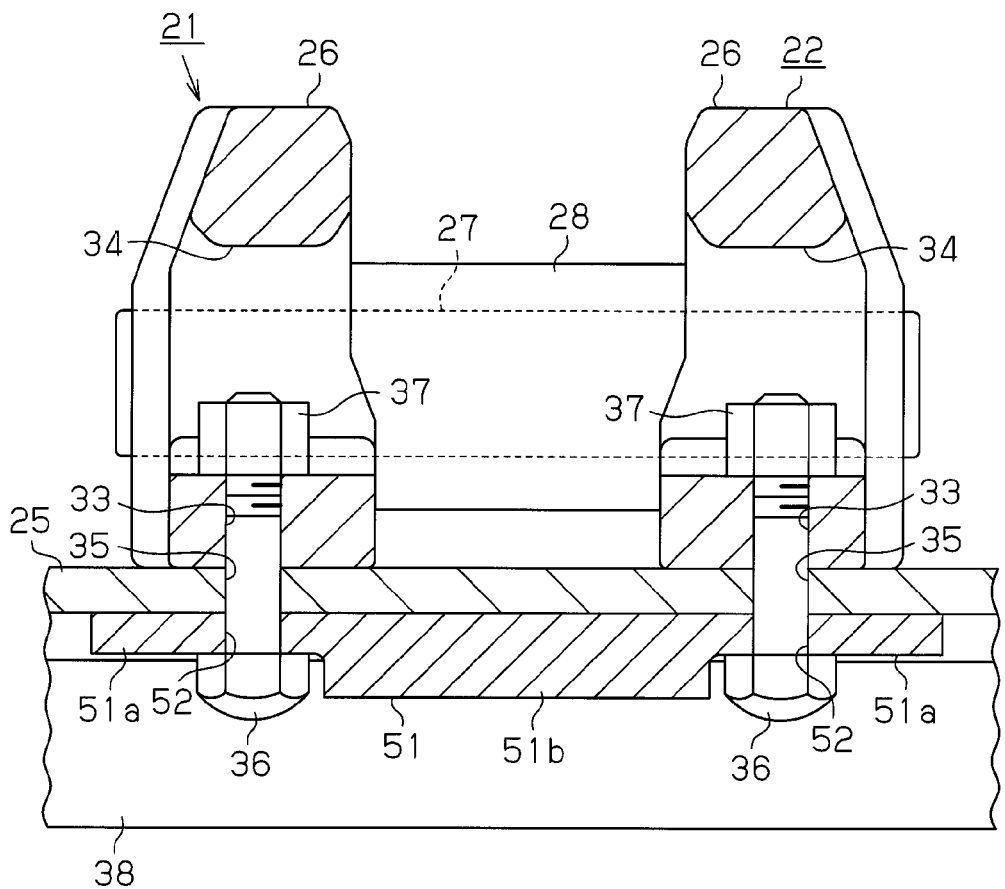
FIG. 7 is a cross-sectional view showing a main part of a track chain having track chain assemblies according to a second embodiment of the present invention.
Figure 8:
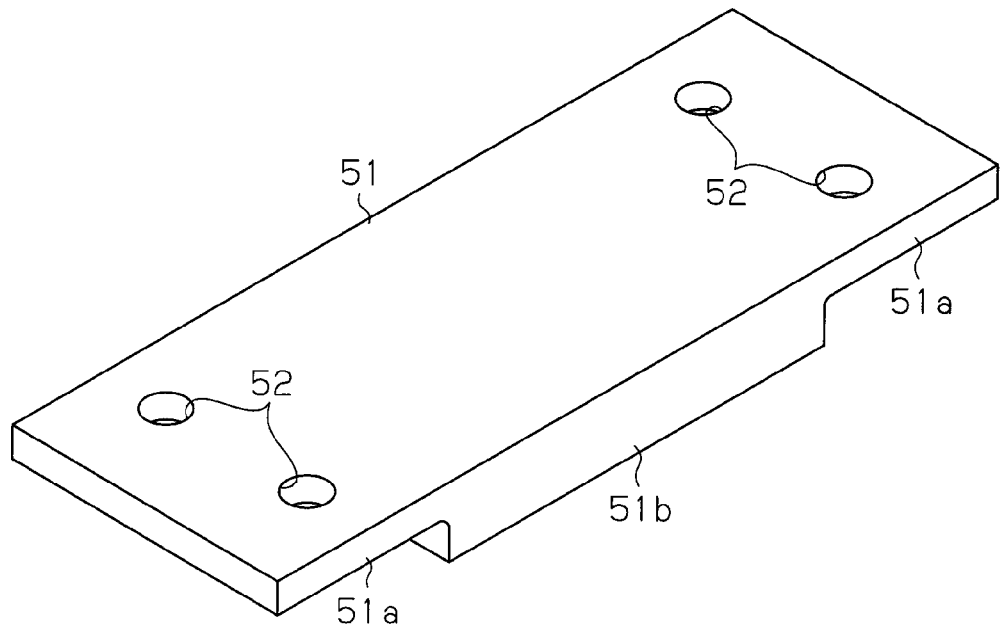
FIG. 8 is a perspective view showing a reinforcing member of each track chain assembly of the track chain shown in FIG. 7.
Figure 9:
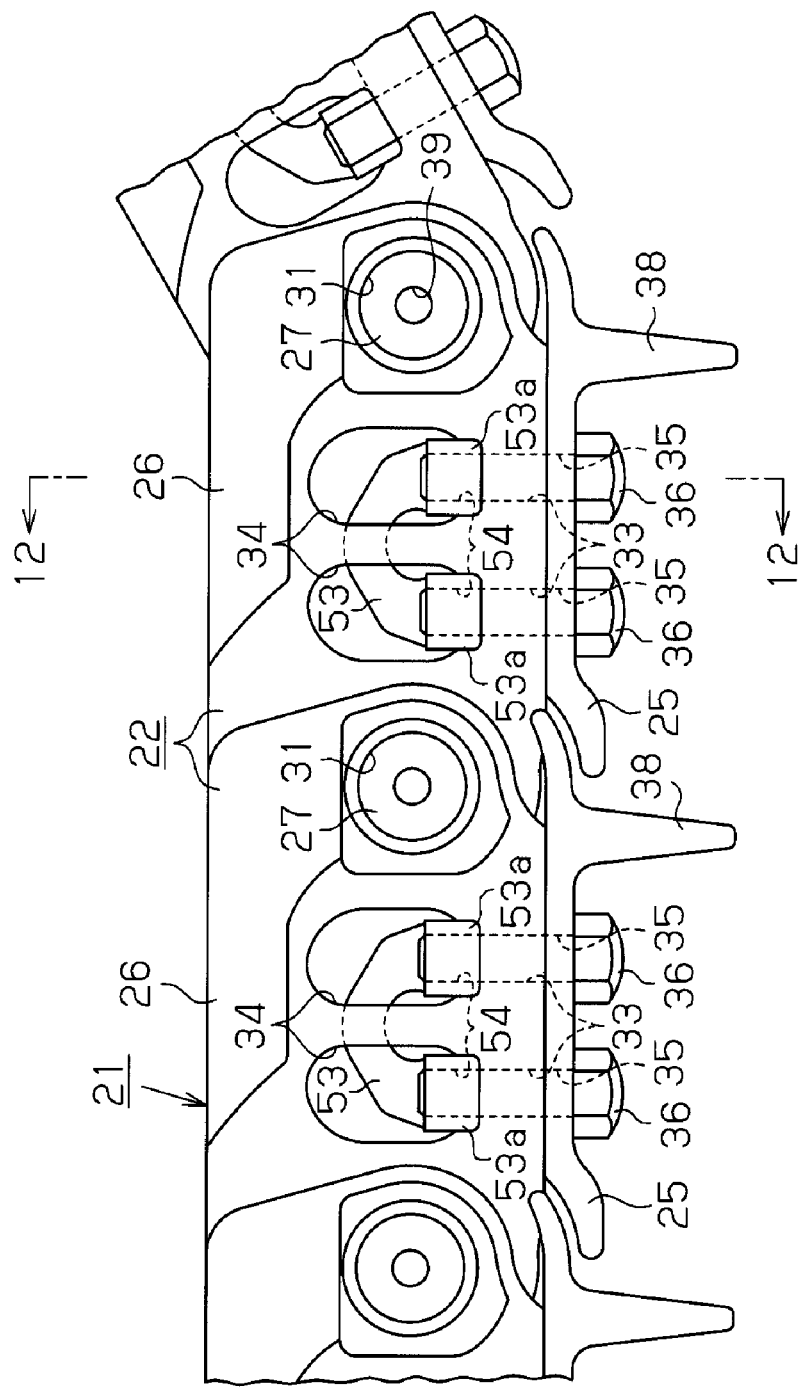
FIG. 9 is a front view partially showing a track chain having track chain assemblies according to a third embodiment of the present invention.
Figure 10:
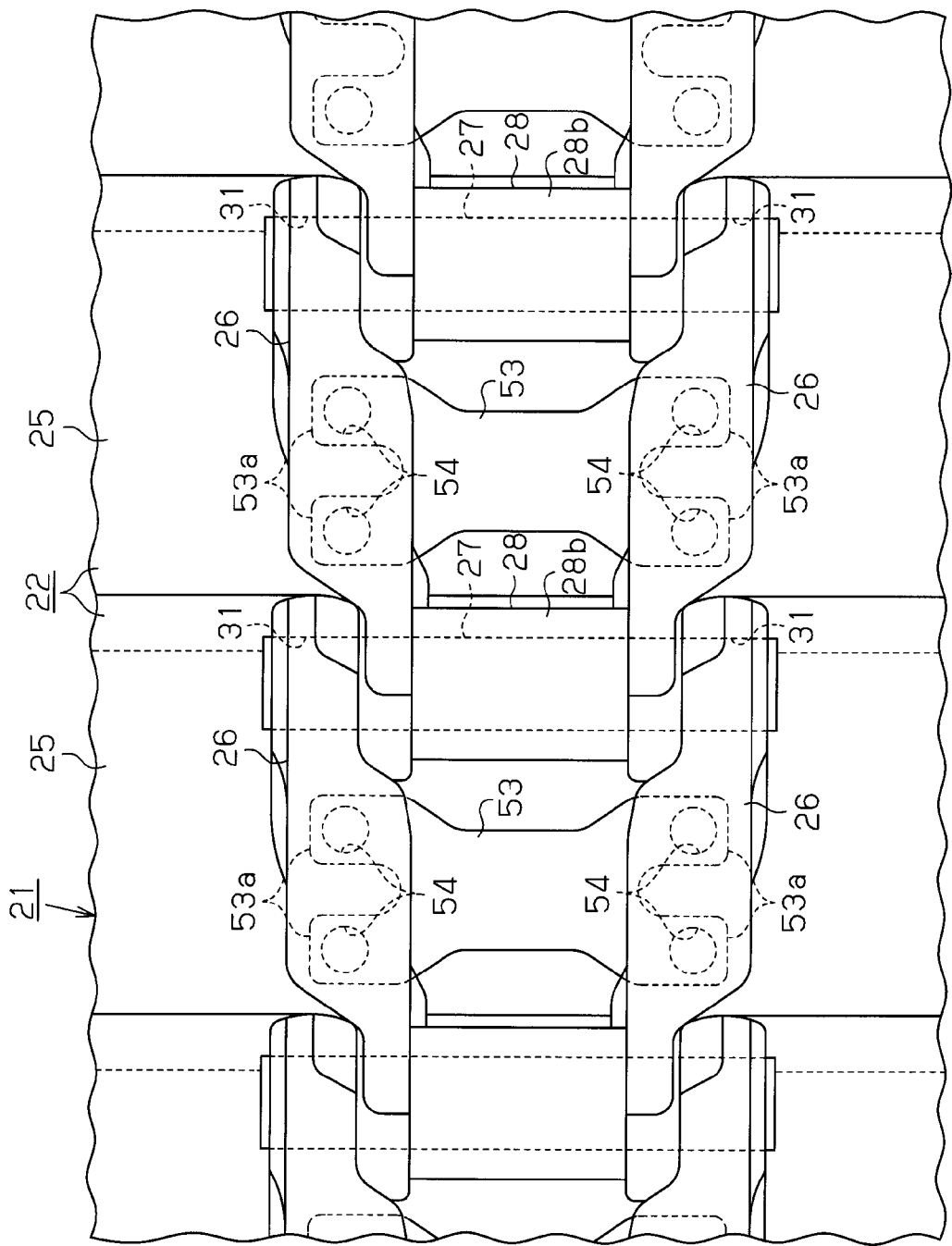
FIG. 10 is a plan view partially showing the track chain of FIG. 9.
Figure 11:
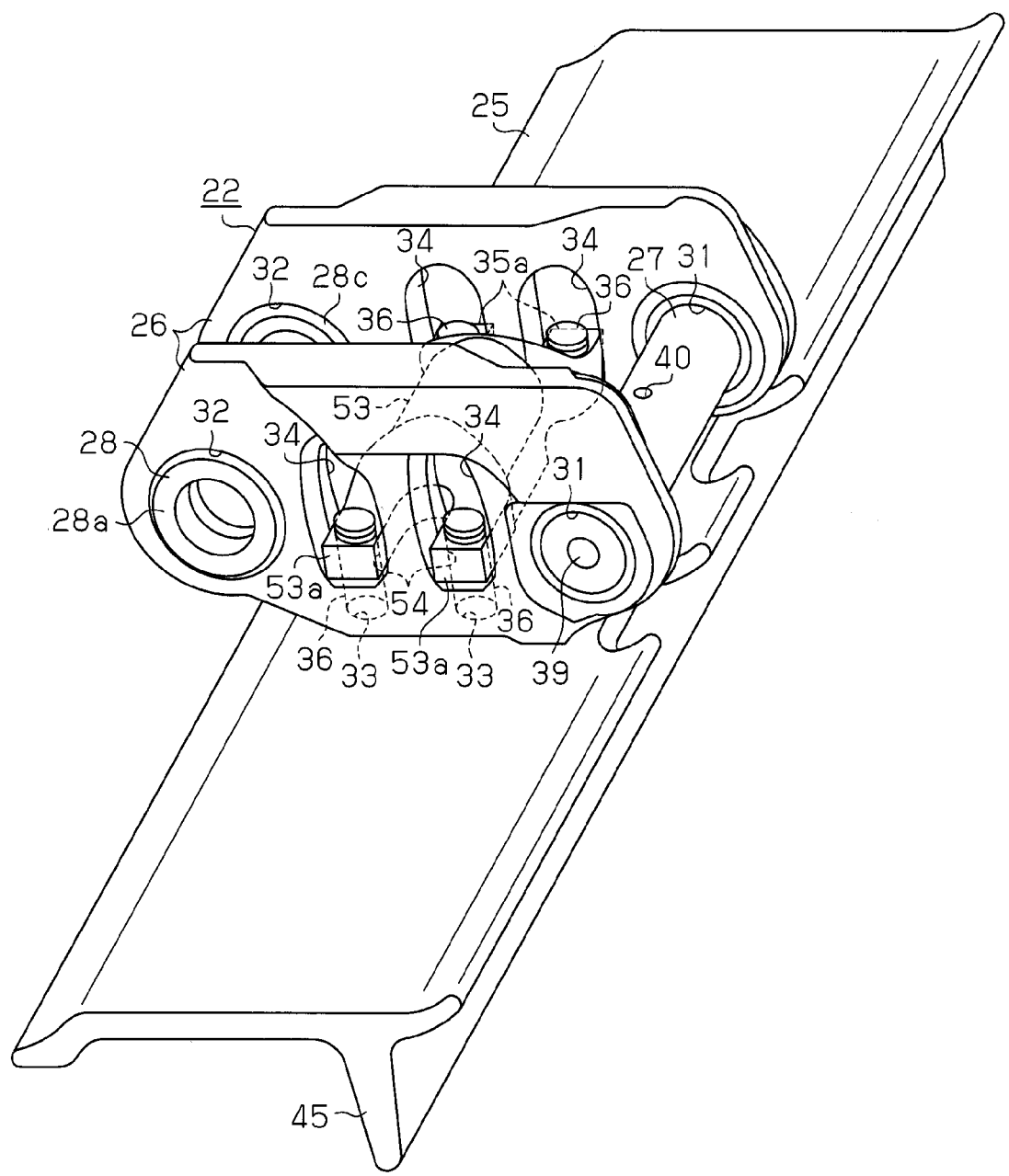
FIG. 11 is a perspective view showing a track chain assembly of the track chain of FIG. 9.
Figure 12:
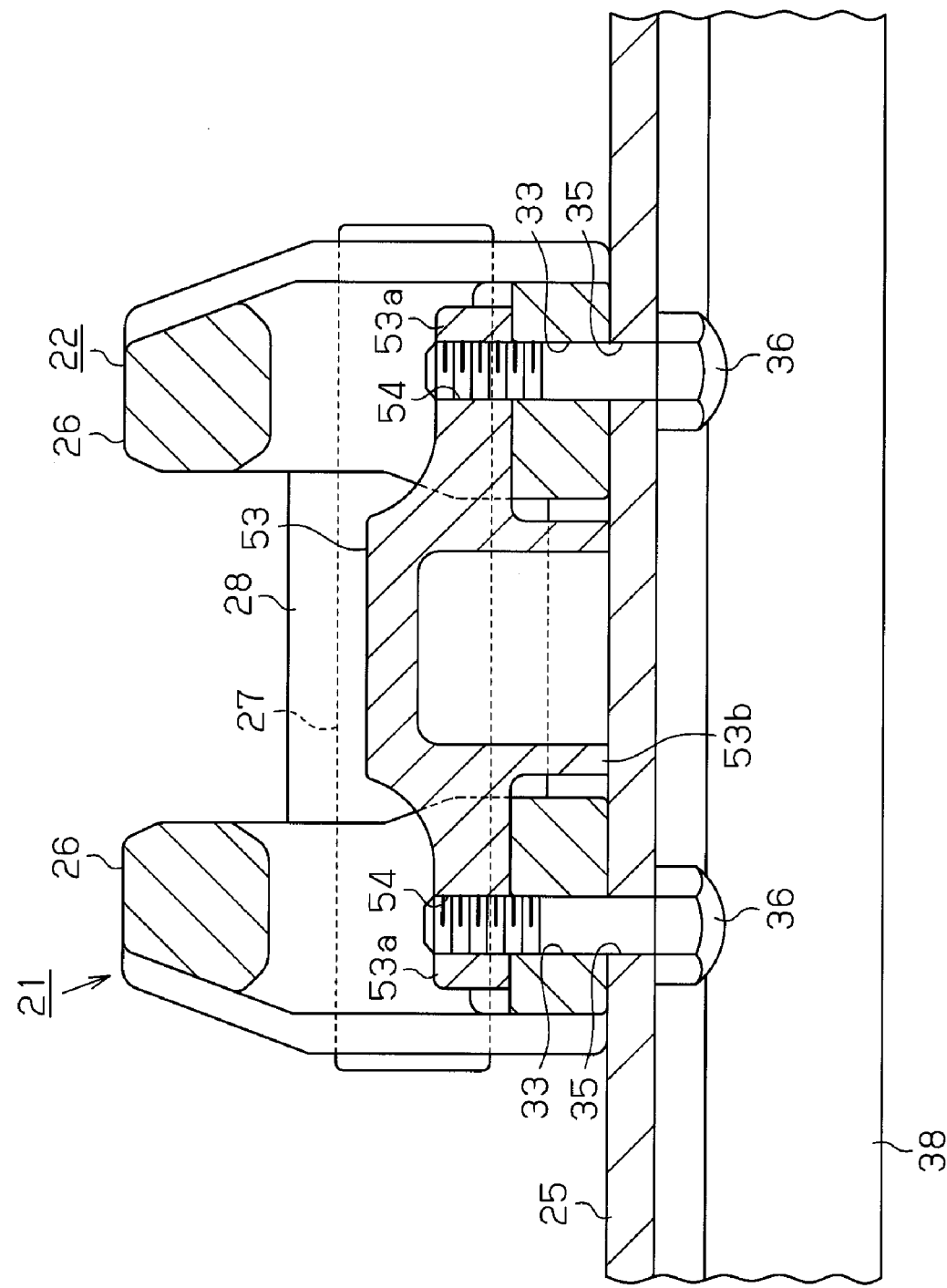
FIG. 12 is a partial enlarged view taken along line 12-12 of FIG. 9.

In a track chain assembly 22 according to the second embodiment, as shown in FIGS. 7 and 8, a reinforcing member 51 is formed such that a thickness of the two end portions corresponding to the heads of the bolts 36 is less than the thickness of the remaining portions. In other words, the two end portions of the reinforcing member 51 form thin portions 51a and a middle portion of the reinforcing member 51 forms a thick portion 51b. A pair of insertion holes 52 where the bolts 36 are inserted are formed in each of the thin portions 51a. When the reinforcing member 51, the track shoe 25, and the links 26 are integrally fixed to each other by the bolts 36 and the nuts 37, the entire area of the head of each bolt 36 is substantially arranged in a recess under the corresponding thin portion 51a.

Therefore, according to the second embodiment, the following advantages are obtained in addition to the advantages of the first embodiment.

A great thickness of the reinforcing member 51 is ensured. Therefore, compared to the first embodiment, the reinforcing member 51 more reliably reinforces the open side between the links 26.

Since the head portions of the bolts 36 are positioned below the thin portions 51a, the head portions of the bolts 36 are protected by the thick portion 51b.

Third Embodiment

Next, a third embodiment of the present invention will now be described. The differences from the first embodiment will mainly be discussed.

In a track chain assembly according to the third embodiment, as shown in FIGS. 9 to 12, a reinforcing member 53 is provided between the links 26 so as to face the non ground-engaging surface of the track shoe 25. A pair of attachment leg portions 53a are provided on each of the two end portions of the reinforcing member 53. The pair of attachment leg portions 53a are arranged in the respective window holes 34 of the corresponding link 26. An internal thread 54 is formed on each attachment leg portion 53a. In a state that the attachment leg portions 53a are arranged in the window holes 34 of the links 26, the bolts 36 which are inserted through the insertion holes 35 of the track shoe 25 and the insertion holes 33 of the link 26 are screwed to the internal threads 54. Accordingly, the track shoe 25, the links 26, and the reinforcing member 53 are integrally fixed to each other. A contact portion 53b is formed on a lower surface of the reinforcing member 53. The contact portion 53b contacts the non ground-engaging surface of the track shoe 25.

Therefore, according to the third embodiment, the following advantages are obtained in addition to the advantages of the first embodiment.

Since the attachment leg portions 53a of the reinforcing member 53 are arranged in the window holes 34 of the links 26, the reinforcing member 53 is provided between the links 26 so as to face the non ground-engaging surface of the track shoe 25 without interfering with the links 26. Accordingly, the links 26 are connected directly to each other by the reinforcing member 53.

Since the bolts 36 are threaded to the internal threads 54 of the attachment leg portions 53a, the nuts for fixing the bolts 36 are not required. This reduces the number of parts.

Since the contact portion 53b of the reinforcing member 53 contacts the non ground-engaging surface of the track shoe 25, the assembling strength of the links 26, the track shoe 25, and the reinforcing member 53 is increased.

Fourth Embodiment

Next, a fourth embodiment of the present invention will now be described. The differences from the first embodiment will mainly be discussed.

Figure 14:
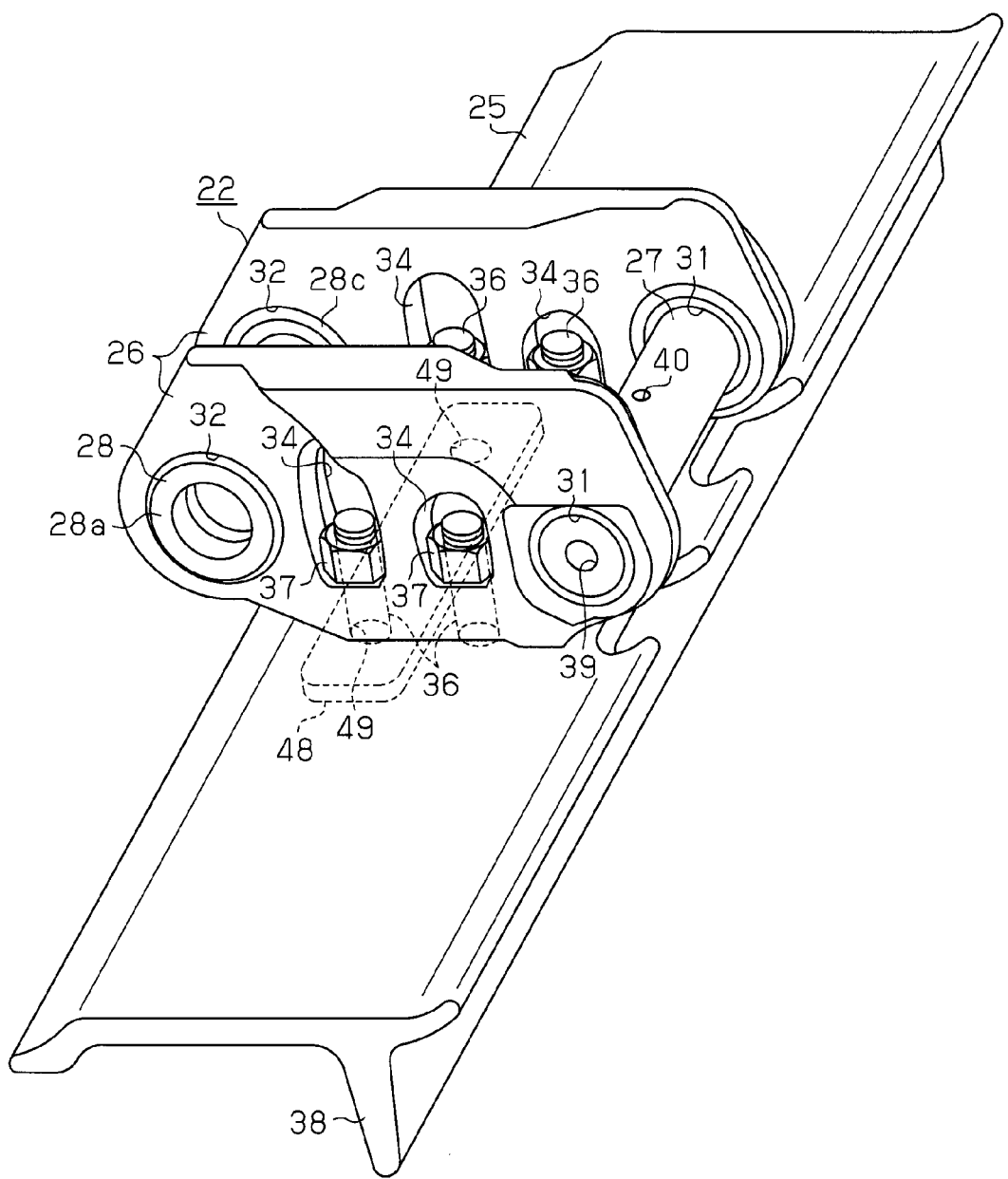
FIG. 14 is a perspective view showing a track chain assembly of the track chain of FIG. 13.

In a track chain assembly 22 according to the fourth embodiment, as shown in FIG. 14, an opening area of the window hole 34 closer to the connecting shaft 27 is smaller than an opening area of the window hole 34 closer to the sleeve 28. In other words, an opening area of the window hole 34 far from the open side between the links 26 is smaller than an opening area of the window hole 34 closer to the open side. Therefore, the rigidity of the links 26 is less at a portion near the second shaft holes 32 than at a portion near the first shaft holes 31.

On the other hand, the reinforcing member 48 is fixed on the ground-engaging surface of the track shoe 25 as same as in the first embodiment. However, the width of the reinforcing member 48 of the fourth embodiment is less than that of the reinforcing member 48 of the first embodiment. The reinforcing member 48 is fixed to the track shoe 25 only by the bolts 36 that are positioned near the open side between the links 26.

Therefore, according to the fourth embodiment, the following advantages are obtained.

Since the reinforcing member 48 is small in size, assembling of the reinforcing member 48 is easy.

Since the rigidity of the links 26 becomes smaller toward the open side between the two window holes 34, the stress concentration on a specific portion of each link 26 is suppressed. Therefore, the strength of the links 26 is increased.

Fifth Embodiment

Next, a fifth embodiment of the present invention will now be described. The differences from the first embodiment will mainly be discussed.

Figure 15:
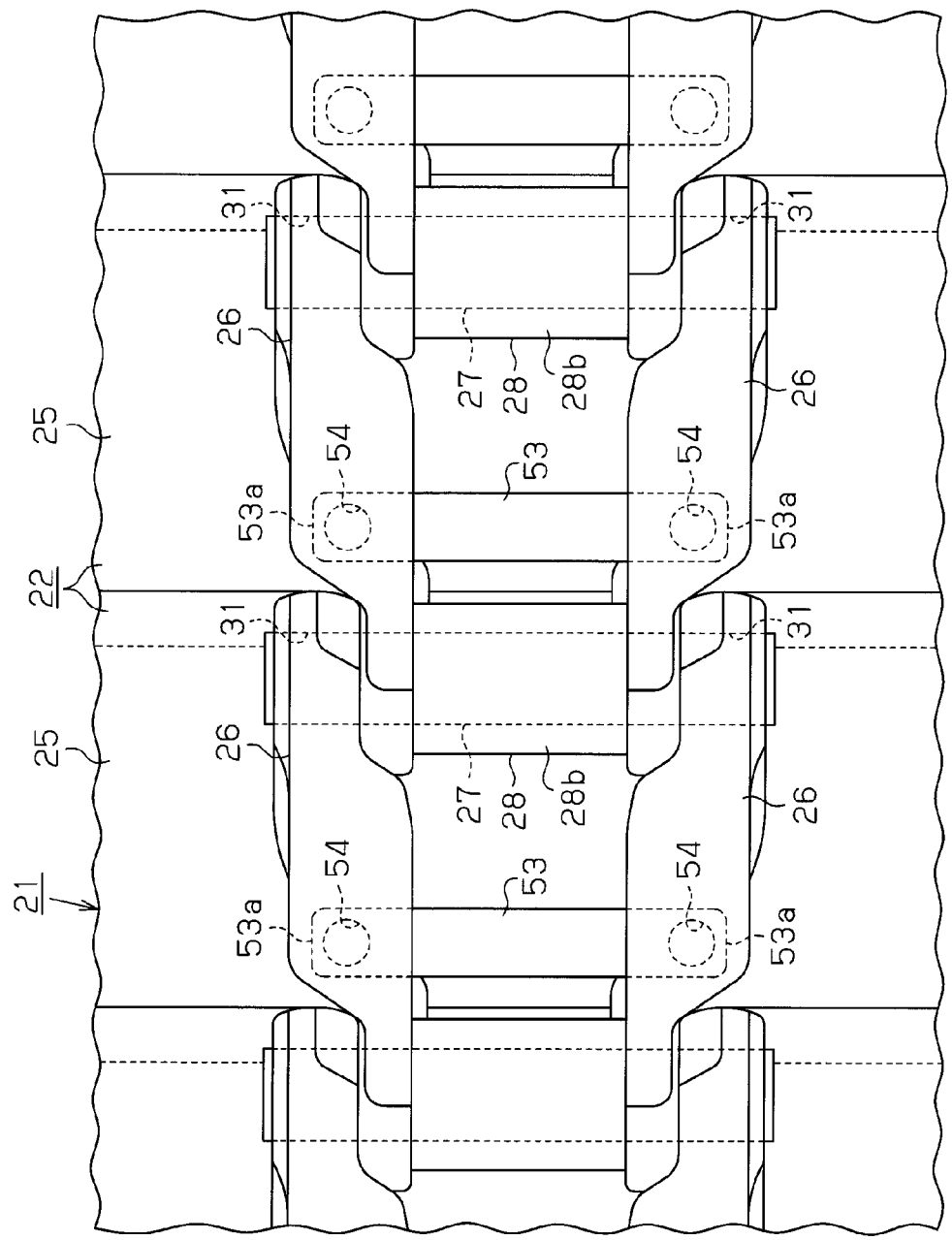
FIG. 15 is a plan view partially showing a track chain having track chain assemblies according to a fifth embodiment of the present invention.
Figure 16:
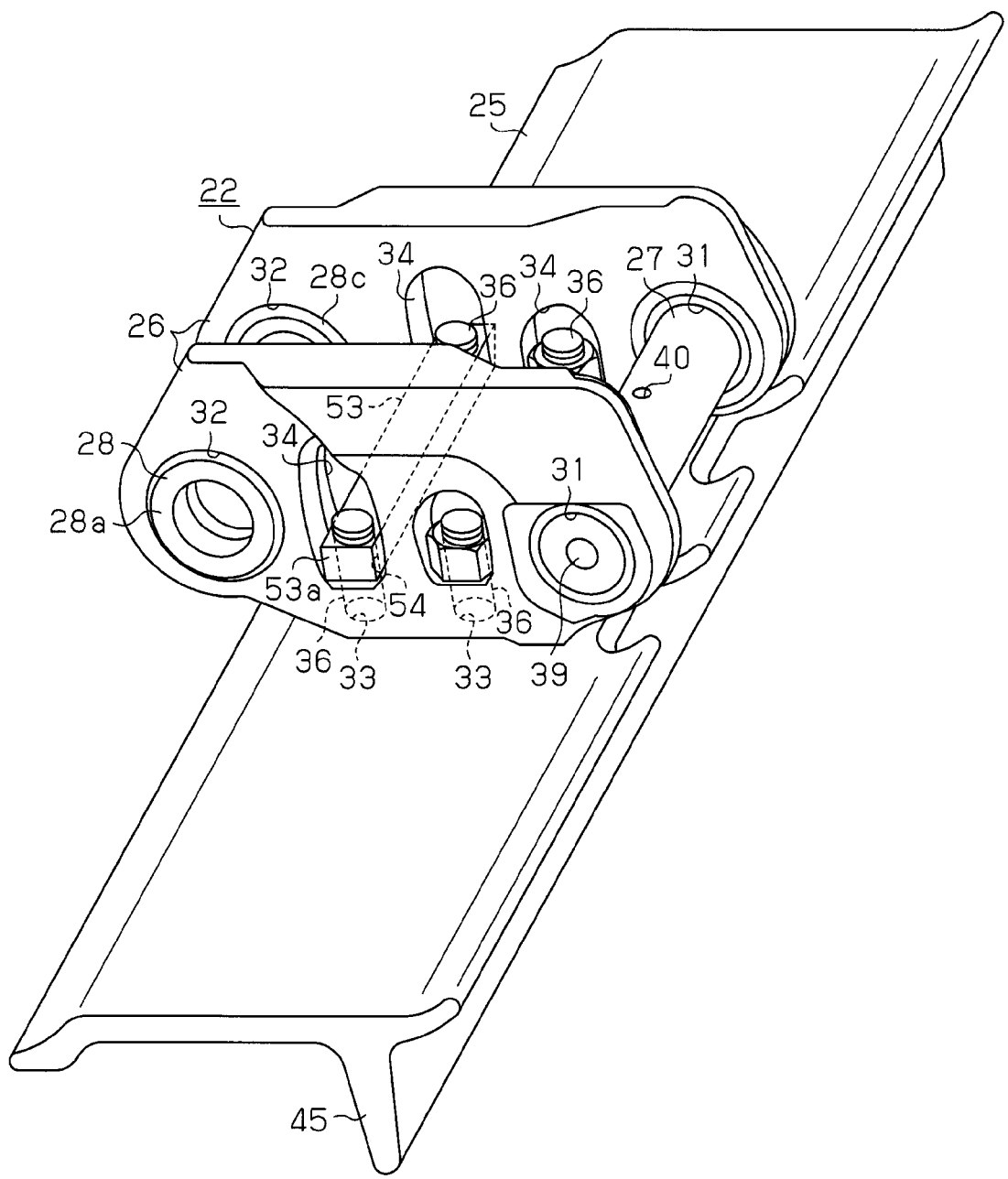
FIG. 16 is a perspective view showing a track chain assembly of the track chain of FIG. 15.

As shown in FIGS. 15 and 16, the links 26 having the same configuration as the fourth embodiment are used in a track chain assembly 22 according to the fifth embodiment. The reinforcing member 53 is provided between the links 26 so as to face the non ground-engaging surface of the track shoe 25. The reinforcing member 53 has a width corresponding to the size of the window holes 34 with the larger opening area. The same advantages as is in the fourth embodiment are obtained in the fifth embodiment.

(Modifications)

Each of the above embodiments may be modified as described below.

In the first to third embodiments, the opening area of the window hole 34 closer to the connecting shaft 27 may be smaller than the opening area of the window hole 34 closer to the open side between the links 26.

Figure 13:
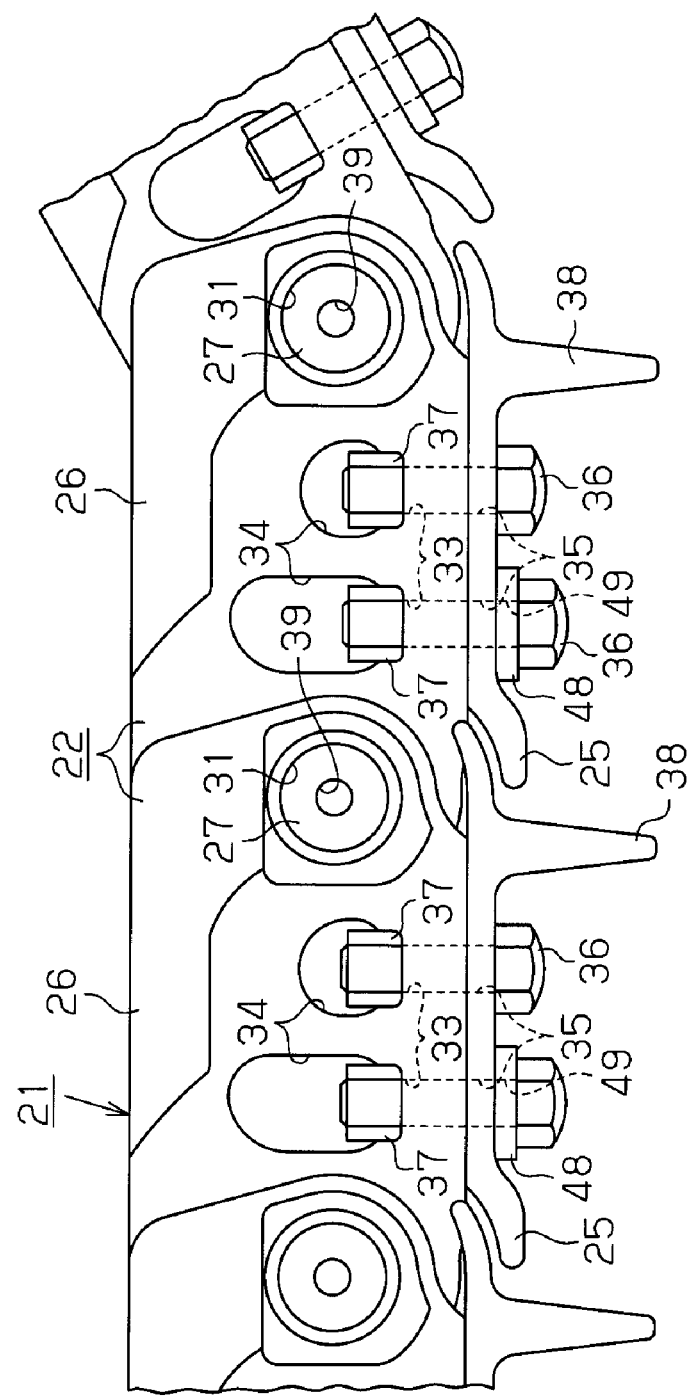
FIG. 13 is a front view partially showing a track chain having track chain assemblies according to a fourth embodiment of the present invention.

In the fourth embodiment shown in FIGS. 13 and 14, the thickness of the two end portions of the reinforcing member 48 corresponding to the head portions of the bolts 36 may be less than other portions as in the second embodiment shown in FIGS. 7 and 8.

In the second embodiment, instead of forming the thin portion 51a over the entire area of the each end portion of the reinforcing member 51, a circular recess maybe formed only in each of the portions of the reinforcing member 51 corresponding to the head portions of the bolts 36.

In the third embodiment shown in FIGS. 9 to 12, the contact portion 53b of the reinforcing member 53 that contacts the non ground-engaging surface of the track shoe 25 may be omitted.

What is claimed is:

1. A track chain assembly comprising:
a track shoe having a ground-engaging surface and a non ground-engaging surface that is opposite to the ground-engaging surface, wherein a grouser is provided on the ground-engaging surface;
a plurality of bolts;
a pair of parallel links that are fixed to the non ground-engaging surface of the track shoe by the bolts, each of the links having a first end portion and a second end portion, wherein a shaft hole is provided in the first end portion and the second end portion of each of the links, and the first end portion and the second end portion of each of the links are connectable to other adjacent links;
a connecting shaft fixed to the shaft holes provided in the first end portions of the links;
an open area between the links, the open area being created by spacing the second end portions of the links so as to be free from each other; and
a reinforcing member that is formed separately from the track shoe and connects the pair of links with the bolts, thereby reinforcing the open area, wherein the reinforcing member is provided on the ground-engaging surface of the track shoe.

2. The track chain assembly according to claim 1, wherein portions of the reinforcing member corresponding to head portions of the bolts are thinner than remaining portions of the reinforcing member.

3. A track chain assembly according to claim 1 wherein said reinforcing member is formed as a plate.

* * * * *